(12) United States Patent
Sindhagatta Krishnappa et al.

(10) Patent No.: US 12,493,930 B2
(45) Date of Patent: Dec. 9, 2025

(54) SYSTEM AND METHOD FOR GENERATING ASTRO-LAPSE VIDEO ON USER DEVICE

(71) Applicant: SAMSUNG ELECTRONICS CO., LTD., Suwon-si (KR)

(72) Inventors: Pradeep Kumar Sindhagatta Krishnappa, Bangalore (IN); Seunghun Kim, Suwon-si (KR); Pradhit Ongole, Bangalore (IN); Adithya S Kamath, Bangalore (IN); Muneeswaran Santhanam, Virudhunagar (IN); Prasanth Kammampati, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 18/420,041

(22) Filed: Jan. 23, 2024

(65) Prior Publication Data

US 2024/0249389 A1 Jul. 25, 2024

(30) Foreign Application Priority Data

Jan. 23, 2023 (IN) .............................. 202341004536
Dec. 12, 2023 (IN) .............................. 202341004536

(51) Int. Cl.
*G06T 5/50* (2006.01)
*G06T 7/11* (2017.01)
(Continued)

(52) U.S. Cl.
CPC .................. *G06T 5/50* (2013.01); *G06T 7/11* (2017.01); *G06T 7/20* (2013.01); *G06V 10/60* (2022.01);
(Continued)

(58) Field of Classification Search
None
See application file for complete search history.

(56) References Cited

U.S. PATENT DOCUMENTS 6,304,376 B1 10/2001 Baun et al.
10,267,890 B2 4/2019 Shen et al.
(Continued)

FOREIGN PATENT DOCUMENTS

JP 2015-184614 A 10/2015
JP 2016-145943 A 8/2016
(Continued)

OTHER PUBLICATIONS

International Search Report (PCT/ISA/210) and Written Opinion (PCT/ISA/237) issued by the International Searching Authority on May 13, 2024 in International Patent Application No. PCT/KR2024/001070.
(Continued)

*Primary Examiner* — Peter Hoang
(74) *Attorney, Agent, or Firm* — Sughrue Mion, PLLC

(57) ABSTRACT

A method (1300) and system (201) for generating an astro-lapse video on a user device is disclosed. Initially, at least one current frame comprising one or more stars, is captured via the user device. Further, region(s) with a degree of exposure and focus greater or less than a predefined threshold are determined and a set of subsequent frames including the stars are captured. The exposure and focus of region(s) in the subsequent frames is corrected during the capturing based on degree of exposure and focus of the region(s) within the current frame. Further, fusion weights of the current and subsequent frames are determined based on one or more cloud categories and associated cloud density scores. Finally, an astro-lapse video is generated by fusing
(Continued)

the at least one current frame and the set of subsequent frames based on the determined fusion weights.

20 Claims, 15 Drawing Sheets

(51) Int. Cl.
  *G06T 7/20* (2017.01)
  *G06V 10/60* (2022.01)
  *G06V 10/764* (2022.01)
(52) U.S. Cl.
  CPC .. *G06V 10/764* (2022.01); *G06T 2207/20221* (2013.01); *G06T 2207/30241* (2013.01); *G06V 2201/07* (2022.01)

(56) References Cited

U.S. PATENT DOCUMENTS

| | | |
|---|---|---|
| 11,308,580 B2 | 4/2022 | Ishibashi |
| 2003/0156324 A1 | 8/2003 | Baun et al. |
| 2014/0036233 A1 | 2/2014 | Posehn |
| 2015/0377999 A1 | 12/2015 | Shen et al. |
| 2017/0134666 A1 | 5/2017 | Liu |
| 2018/0167545 A1 | 6/2018 | Kosaka |
| 2020/0329199 A1 | 10/2020 | Nomura |
| 2022/0385817 A1 | 12/2022 | Leu et al. |

FOREIGN PATENT DOCUMENTS

| | | |
|---|---|---|
| JP | 2016-200700 A | 12/2016 |
| JP | 6700937 B2 | 5/2020 |
| JP | 2020-202452 A | 12/2020 |
| JP | 2022-154347 A | 10/2022 |
| KR | 10-2017-0050448 A | 5/2017 |
| KR | 10-2022-0159850 A | 12/2022 |
| WO | 2021/126004 A1 | 6/2021 |

OTHER PUBLICATIONS

Office Action dated Aug. 7, 2025, issued by Indian Patent Office in Indian Patent Application No. 202341004536.

800

1000b

# SYSTEM AND METHOD FOR GENERATING ASTRO-LAPSE VIDEO ON USER DEVICE

CROSS-REFERENCE TO RELATED APPLICATIONS

This application is based on and claims priority under 35 U.S.C. § 119 to Indian Provisional Application No. 202341004536, filed on Jan. 23, 2023, and Indian Complete Specification application No. 202341004536, filed on Dec. 12, 2023, in the Indian Intellectual Property Office, the disclosures of which are incorporated by reference herein in their entireties.

TECHNICAL FIELD

Embodiments disclosed herein relate to astrophotography and astro-videography, and more particularly, to a system and a method for generating an astro-lapse video on a user device in real time.

BACKGROUND ART

Astrophotography and astro-videography relate to celestial objects and related events through images and video recording. Astrophotography and astro-videography have been gaining popularity in recent times not only among professionals but also among the general public. For example, users may capture dynamic movements of celestial bodies such as planetary transition, eclipses, star trails, and the like. Nowadays, electronic devices and cameras (for example, smartphone cameras) have various configurations such as exposure times, focus, and hyper-lapse to capture such dynamic movements.

In conventional techniques, videos are generally captured using the hyper-lapse mode of the camera due to the slow relative motion of the celestial bodies. In addition, exposure times are set on a higher side. To properly capture the video, the camera must remain still to avoid undesired trails due to high exposure times. Tripods are generally utilized as support for the associated devices capturing the video. Initially, the electronic device having the cameras may capture the scene using certain values for exposure, aperture, focus, and the like. The cameras may then capture multiple images automatically in conjunction with an intervalometer.

Next, to increase the quality of the video output, post-processing tasks are generally performed on the captured video. The post-processing tasks include object masking (to remove smudging of celestial bodies' path), undesired object removal, celestial body re-painting, frame blending, contrast adjustments, sharpness adjustments, etc. In many cases, the post-processing may be done manually using processing tools.

Conventional techniques suffer from multiple drawbacks. For example, the conventional techniques do not allow dynamic adaptation to changing scenes being captured. Adjustment of exposure and focus is not possible during capture. Additionally, conventional techniques do not include efficient real-time processing and rely heavily on post-processing of the captured videos. The post-processing of video output is not only undesirable and time-consuming but also requires advance knowledge of editing tools.

Thus, it is desired to address the above-mentioned disadvantages or other shortcomings or at least provide a useful alternative to overcome the above-mentioned disadvantages.

DISCLOSURE OF INVENTION

Solution to Problem

This summary is provided to introduce a selection of concepts, in a simplified format, that are further described in the detailed description of the disclosure. This summary is neither intended to identify essential inventive concepts of the disclosure nor is it intended for determining the scope of the disclosure.

Disclosed herein is a method for generating an astro-lapse video on a user device. The method comprises capturing at least one current frame via the user device, wherein the at least one current frame comprises one or more stars. Further, the method comprises determining, within the at least one current frame, one or more regions with a degree of exposure and focus being one of greater or less than a predefined threshold. Further, the method comprises capturing a set of subsequent frames comprising the one or more stars, wherein the exposure and focus of corresponding one or more regions in the set of subsequent frames is corrected during the capturing based on the degree of exposure and focus of the one or more regions within the at least one current frame. Furthermore, the method comprises determining fusion weights of the at least one current frame and the set of subsequent frames based on one or more cloud categories and a cloud density score associated with each of the one or more cloud categories. Moreover, the method comprises generating an astro-lapse video by fusing the at least one current frame and the set of subsequent frames based on the determined fusion weights.

Also disclosed herein is a system for generating an astro-lapse video on a user device. The system comprises a memory and at least one processor coupled with the memory. The at least one processor is configured to capture at least one current frame via the user device, wherein the at least one current frame comprises one or more stars. Further, the at least one processor is configured to determine, within the at least one current frame, one or more regions with a degree of exposure and focus being one of greater or less than a predefined threshold. Further, the at least one processor is configured to capture a set of subsequent frames comprising the one or more stars, wherein the exposure and focus of corresponding one or more regions in the set of subsequent frames is corrected during the capturing based on the degree of exposure and focus of the one or more regions within the at least one current frame. Further, the at least one processor is configured to determine fusion weights of the at least one current frame and the set of subsequent frames based on one or more cloud categories and a cloud density score associated with each of the one or more cloud categories. Further, the at least one processor is configured to generate an astro-lapse video by fusing the at least one current frame and the set of subsequent frames based on the determined fusion weights.

To further clarify the advantages and features of the present disclosure, a more particular description of the disclosure will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail in the accompanying drawings.

DESCRIPTION OF DRAWINGS

These and other features, aspects, and advantages of the present disclosure will become better understood when the following detailed description is read with reference to the accompanying drawings in which like characters represent like parts throughout the drawings, wherein.

Figure 1:
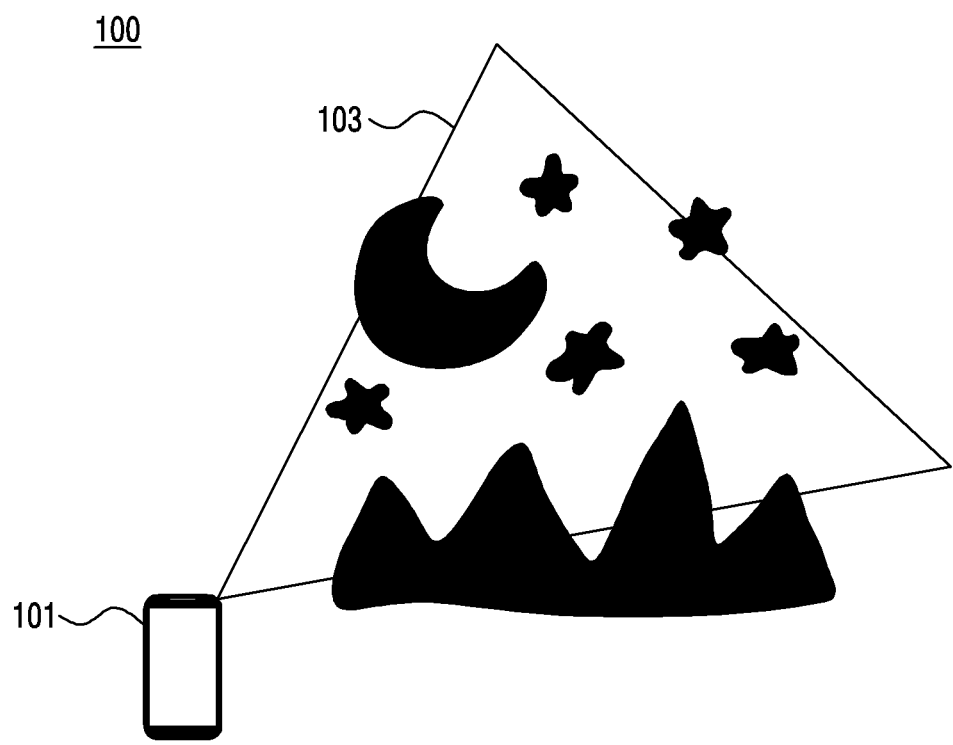
FIG. 1 illustrates an exemplary overview of an environment comprising a user device and a scene intended to be captured by a user by means of the user device, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

MODE FOR INVENTION

For the purpose of promoting an understanding of the principles of the disclosure, reference will now be made to the various embodiments and specific language will be used to describe the same. It should be understood at the outset that although illustrative implementations of the embodiments of the present disclosure are illustrated below, the present disclosure may be implemented using any number of techniques, whether currently known or in existence. The present disclosure is not necessarily limited to the illustrative implementations, drawings, and techniques illustrated below, including the exemplary design and implementation illustrated and described herein, but may be modified within the scope of the present disclosure It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

It is to be understood that as used herein, terms such as, "includes," "comprises," "has," etc. are intended to mean that the one or more features or elements listed are within the element being defined, but the element is not necessarily limited to the listed features and elements, and that additional features and elements may be within the meaning of the element being defined. In contrast, terms such as, "consisting of" are intended to exclude features and elements that have not been listed.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, micro-controllers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The present disclosure is directed towards a method and a system for generating an astro-lapse video on a user device.

FIG. 1 illustrates an exemplary overview of an environment 100 comprising a user device 101 and a scene 103 intended to be captured by a user using the user device 101, according to an embodiment of the present disclosure. The scene 103 may refer to any real-life view intended to be captured via the user device 101. In some embodiments, the scene 103 may be associated with the sky, for instance, the sky at night. The scene 103 may include one or more objects, such as, but not limited to, stars. In some embodiments, the scene 103 may also include additional objects such as birds, aerial vehicles, etc. In some embodiments, a tripod (not shown in FIG. 1) may be used to support the user device in capturing the scene 103.

The user device 101 may include a system (not shown in FIG. 1). For instance, the system may be in communication with the user device 101. The user device 101 may be associated with a user and may include, but is not limited to, a smartphone, a tablet, a professional camera (e.g., a digital single-lens reflex (DSLR) camera), and any other electronic device including a camera configured to facilitate the user to capture images and videos of the scene 103.

Figure 2:
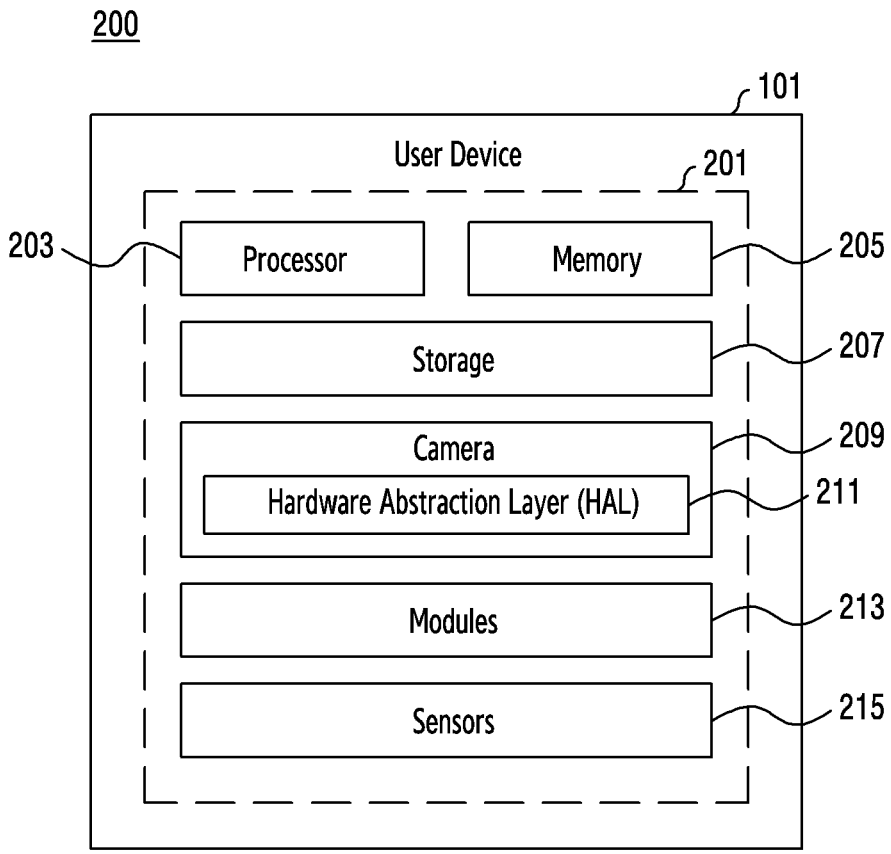
FIG. 2 illustrates a schematic block diagram of the system and the user device, according to an embodiment of the present disclosure.

Reference is made to FIG. 2 which illustrates a schematic block diagram 200 of the system 201 and the user device 101, according to an embodiment of the present disclosure. The system 201 may be integrated within the user device 101. In some embodiments, the system 201 may be a standalone entity located at a remote location and connected to the user device 101 via any suitable network. For example, the system 201 may be implemented on a physical server (not shown) or in a cloud-based architecture and communicably coupled to the user device 101. In some embodiments, the system 201 may be implemented in a distributed manner, in that, one or more components of the system 201 may be implemented within the user device 101, while one or more components of the system 201 may be implemented within a cloud-based server or a physical server.

The system 201 may be configured to enable the generation of an astro-lapse video via the user device by performing one or more operations explained in detail at least with reference to FIGS. 3 through 13.

As depicted in FIG. 2, the system 201 may include a processor 203, a memory 205, a storage 207, a camera 209, module(s) 213, and sensors 215. The camera 209 may further include a Hardware Abstraction Layer (HAL) 211. The camera 209 may be a single camera or a set of cameras configured to capture the scene 103. The user device 101 may include a user interface that enables the user to view the scene 103 being captured through the camera 209. In some embodiments, the camera 209 may be associated with a camera application within the user device 201. In some embodiments, the camera 209 may capture the scene 103 in response to a user input. The user input may be a non-limiting implementation of a shutter button through physical keys or soft keys available on the interface of the user device 101. The camera 209 may further be associated with one or more adjustable configurations or settings such as exposure, focus, hyper-lapse, shutter speed, aperture, etc.

In some embodiments, the system 201 may further include an Input/Output (I/O) interface and a transceiver (not shown). In an exemplary embodiment, the processor 203 may be operatively coupled to each of the I/O interfaces, the modules 213, the transceiver, the memory 205, and the storage 207. In one embodiment, the processor 203 may include at least one data processor for executing processes in Virtual Storage Area Network. The processor 203 may include specialized processing units, such as integrated system (bus) controllers, memory management control units, floating point units, graphics processing units, digital signal processing units, etc. In one embodiment, the processor 203 may include a central processing unit (CPU), a graphics processing unit (GPU), or both. The processor 203 may be one or more general processors, digital signal processors, application-specific integrated circuits, field-programmable gate arrays, servers, networks, digital circuits, analog circuits, combinations thereof, or other now-known or later developed devices for analyzing and processing data. The processor 203 may execute a software program, such as code generated manually (i.e., programmed) to perform the desired operation.

The processor 203 may be disposed in communication with one or more input/output (I/O) devices via the I/O interface. In some embodiments, the processor 203 may communicate with the user device 101 using the I/O interface. In some embodiments, the I/O interface may be implemented within the user device 101. The I/O interface may employ communication code-division multiple access (CDMA), high-speed packet access (HSPA+), global system for mobile communications (GSM), long-term evolution (LTE), WiMax, or the like, etc.

Using the I/O interface, the system 201 may communicate with one or more I/O devices. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc. The transceiver may be configured to receive and/or transmit signals to and from the user device 101.

The processor 203 may be disposed in communication with a communication network via a network interface. In an embodiment, the network interface may be the I/O interface. The network interface may connect to the communication network to enable connection of the system 201 with the user device 101 and/or outside environment. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the system 201 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

In some embodiments, the memory 205 may be communicatively coupled to the processor 203. The memory 205 may be configured to store data, and instructions executable by the at least one processor 203. In one embodiment, the memory 205 may be provided within the user device 101. In another embodiment, the memory 205 may be provided within the system 201 being remote from the user device 101. In yet another embodiment, the memory 205 may communicate with the processor 203 via a bus within the system 201. In yet another embodiment, the memory 205 may be located remotely from the processor 203 and may be in communication with the at least one processor 203 via a network.

The memory 205 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media, and the like. In one example, the memory 205 may include a cache or random-access memory for the at least one processor 203. In alternative examples, the memory 205 is separate from the at least one processor 203, such as a cache memory of a processor, the system memory, or other memory. The memory 205 may be an external storage device or database for storing data. The memory 205 may be operable to store instructions executable by the at least one processor 203. The functions, acts, or tasks illustrated in the figures or described may be performed by the at least one processor 203 for executing the instructions stored in the memory 205. The functions, acts, or tasks are independent of the particular type of instructions set, storage media, processor, or processing strategy and may be performed by software, hardware, integrated circuits, firmware, microcode, and the like, operating alone or in combination. Likewise, processing strategies may include multiprocessing, multitasking, parallel processing, and the like.

In some embodiments, the modules 213 may be included within the memory 205. The memory 205 may further include a database to store data. The modules 213 may include a set of instructions that may be executed to cause the system 201, in particular, the processor 203 of the system 201, to perform any one or more of the methods/processes disclosed herein. The modules 213 may be configured to perform the steps of the present disclosure using the data stored in the database. For instance, the modules 213 may be configured to perform the steps disclosed in FIG. 4. In an embodiment, each of the modules 213 may be a hardware unit that may be outside the memory 205. Further, the memory 205 may include an operating system for performing one or more tasks of the system 201, as performed by a generic operating system.

Further, the present disclosure contemplates a computer-readable medium that includes instructions or receives and executes instructions responsive to a propagated signal. Further, the instructions may be transmitted or received over the network via a communication port or interface or using a bus (not shown). The communication port or interface may be a part of the processor 203 or may be a separate component. The communication port may be created in software or may be a physical connection in hardware. The communication port may be configured to connect with a network, external media, the display, or any other components in the system, or combinations thereof. The connection with the network may be a physical connection, such as a wired Ethernet connection, or may be established via a wireless technique. Likewise, the additional connections with other components of the system 201 may be physical or may be established via the wireless technique. The network may alternatively be directly connected to a bus. For the sake of brevity, the architecture and standard operations of the operating system, the memory 205, the processor 203, the transceiver, and the I/O interface are not discussed in detail.

The one or more sensors 215 may include, but are not limited to, an inertial measurement unit (IMU), global positioning system (GPS) sensor. The IMU may refer to a combination of accelerometers and gyroscopes to measure the device's motion and orientation in three-dimensional space. According to embodiments of the present disclosure, data obtained from the one or more sensors 215 may be utilized by modules 213 of the user device 101.

The modules 213 may include a set of instructions that may be executed to cause the user device 101 to generate the astro-lapse video. The modules 213 and operational flow of the modules are described below in detail in conjunction with FIGS. 3 and 4.

Figure 3:
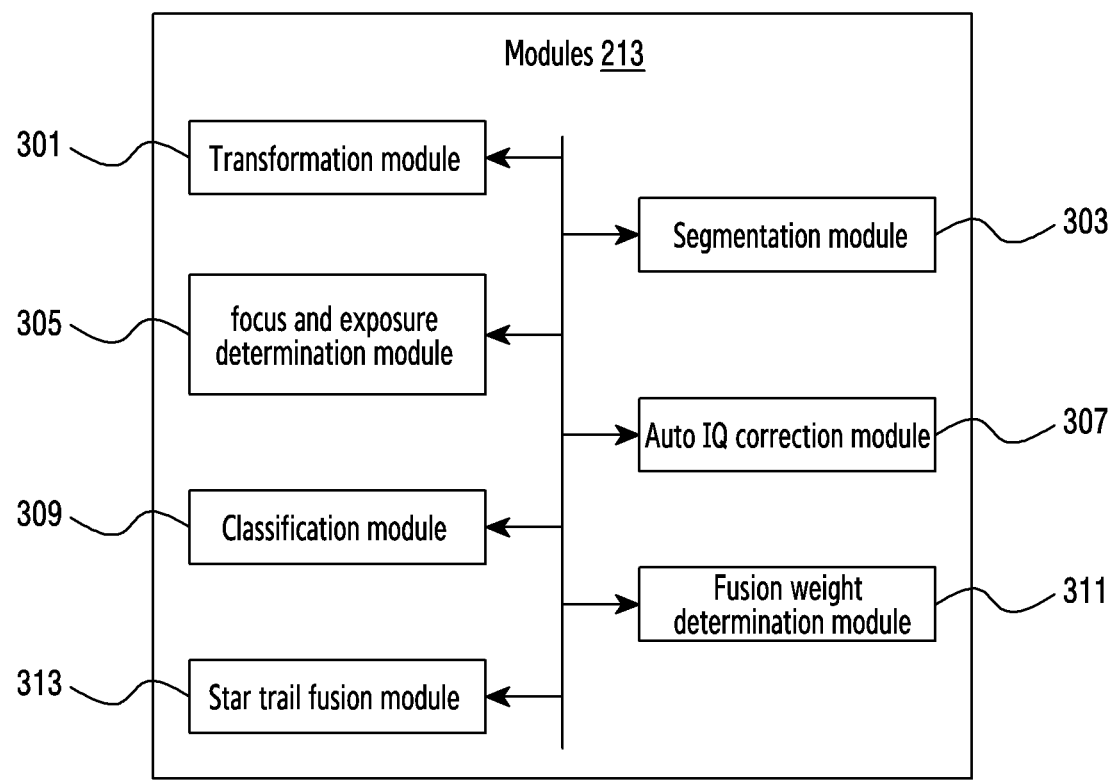
FIG. 3 illustrates a block diagram depicting modules for generating astro-lapse video, according to an embodiment of the present disclosure.
Figure 4:
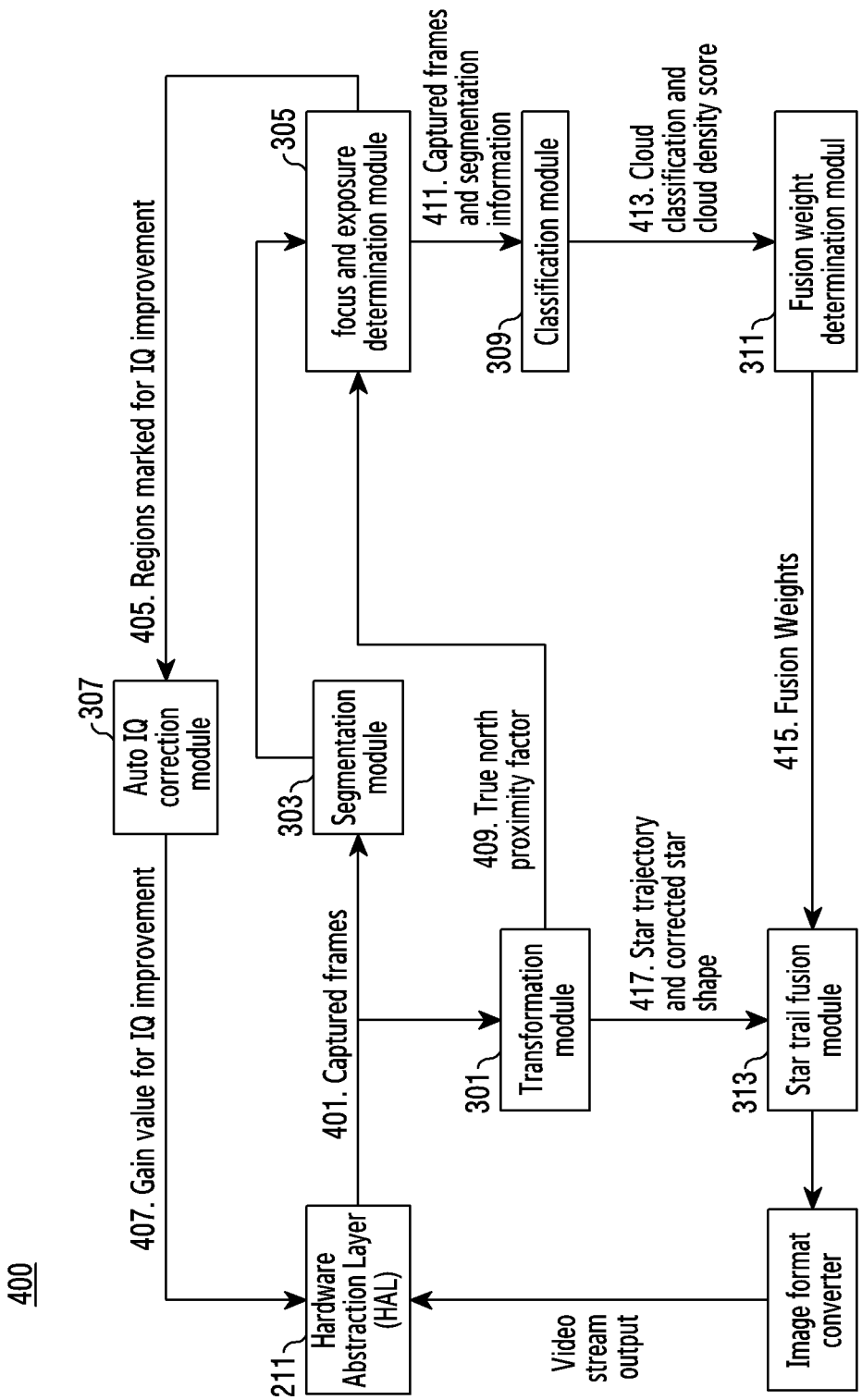
FIG. 4 illustrates a block diagram depicting an operational flow of the modules, according to an embodiment of the present disclosure.

FIG. 3 illustrates a block diagram 300 depicting modules 213, according to an embodiment of the present disclosure. FIG. 4 illustrates a block diagram 400 depicting an operational flow 400 of the modules 213 and hence will be explained with FIG. 3 for the sake of brevity and ease of reference. Further, the reference numerals were kept the same for the similar components throughout the disclosure for ease of explanation and understanding.

The modules 213 may include a transformation module 301, a segmentation module 303, an focus and exposure determination module 305, an auto IQ correction module 307, a classification module 309, a fusion weight determination module 311, and a star trail fusion module 313.

Initially, the user device 101 captures frames comprising one or more stars via the camera 209. In an embodiment, capturing the frames may mean obtaining the frames by capturing the one or more stars via the camera 209. In an embodiment, the captured frames comprise at least one current frame and a set of subsequent frames. As described above, the camera 209 comprises the HAL 211 which, based on methodology provided in the present disclosure, adjusts camera settings, such as focus, exposure, and white balance, to capture frames of the best possible quality. The captured frames are then used as input by the transformation module 301 and the segmentation module 303.

In an embodiment, the transformation module 301 is configured to estimate star trajectories and perform star shape correction and trail adjustments of the one or more stars in the captured frames, as depicted at step 401. According to embodiments of the present disclosure, the transformation module 301 estimates star trajectories, as depicted at step 417, and performs star shape and trail adjustments based on the proximity of the user device 101's pointing direction to true north. Said proximity to the true north is used to determine a true north proximity factor. According to embodiments of the present disclosure, the true north proximity factor corresponds to a factor that determines how close or far the one or more stars are to the true north.

In an alternate embodiment, the transformation module 301 may estimate star trajectories and perform star shape and trail length corrections based on a proximity of the user device 101's pointing direction to true south. In such cases, a true south proximity factor is determined. The true south proximity factor may correspond to the factor that determines how close or far the one or more stars are to the true south. The transformation module 301 is described in greater detail below in conjunction with FIG. 5.

In an embodiment, the segmentation module 303 may be configured to segment each frame (received at step 401) into one or more areas, classify each area into one or more objects such as, but not limited to, sky, mountain, house, water, river, trees, and more. Further, the segmentation module 303 identifies a preferred type of area and one or more non-preferred types of areas from the one or more segmented areas based on the classification of the one or more segmented areas. In an embodiment, the preferred type of area may correspond to an area of interest for capturing and generating astro-lapse video. For example, the sky may be considered as a preferred type of area. The identified preferred type of area and the one or more non-preferred types of area may collectively be called segmentation information.

The segmentation module 303 forwards the captured frames and the segmentation information to the focus and exposure determination module 305, as depicted at step 403. The segmentation module 303 is described in greater detail below in conjunction with FIG. 9.

In an embodiment, the focus and exposure determination module 305 may be configured to determine one or more regions with a degree of exposure and focus being one of greater or less than a predefined threshold. For, example, the focus and exposure determination module 305 may be configured to determine one or more regions with a degree of exposure being one of greater or less than a predefined threshold. For, example, the focus and exposure determination module 305 may be configured to determine one or more regions corresponding to an object for adjusting a focus, when a size of an area occupied by the object to be focused is one of greater or less than a predefined threshold. For, example, the focus and exposure determination module 305 may be configured to determine one or more regions with a degree of exposure and a degree of an area occupied by a focused object being one of greater or less than a predefined threshold. In particular, the one or more regions are determined from the preferred type of areas and may correspond to the regions where image quality (IQ) of the subsequently captured frames may be improved. The focus and exposure determination module 305 divides the preferred type of area into a plurality of blocks and compares brightness of each block with an average brightness of the plurality of blocks to obtain the degree of exposure and focus.

Based on the comparison, the focus and exposure determination module 305 determines the one or more regions corresponding to one or more blocks with the degree of exposure and focus being greater or less than a predefined threshold. In an embodiment, the focus and exposure determination module 305 makes the determination based on the true north proximity factor determined by and received from the transformation module, as depicted at step 409. The determined one or more regions may be marked for IQ improvement and provided as input to the auto IQ correction module 307 as depicted at step 405. The focus and exposure determination module 305 is described in greater detail below in conjunction with FIGS. 10A and 10B.

In an embodiment, the auto IQ correction module 307 may be configured to determine a gain value that may be applied for IQ improvement on the one or more regions in the subsequently captured frames. The auto IQ correction module 307 provides the determined gain value to the HAL 211, as depicted at step 407, which enables the camera 209 to capture a set of subsequent frames comprising the one or more stars, such that the exposure and focus of corresponding one or more regions in the set of subsequent frames is corrected during the capturing based on the degree of exposure and focus of the determined one or more regions within the at least one current frame. The auto IQ correction module 307 is described in greater detail below in the forthcoming paragraphs and in conjunction with FIG. 11.

In an embodiment, the focus and exposure determination module 305 is configured to forward, as depicted at step 411, the captured frames and the segmentation information received from the segmentation module 303 to the classification module 309.

In an embodiment, the classification module 309 is configured to classify each block of the captured frames into one or more cloud categories. The cloud category may be a category which is used for classifying states of a sky according to extent to which the sky is covered by clouds. Further, each block of the captured frames is classified based on the extent which the sky is covered by the clouds, and each block of the captured frames corresponds to one of the cloud categories such as, but not limited to, clear sky, partly cloudy, and overcast. Further, the classification module 309 determines a cloud density score for each classified cloud category. The cloud density score may be a value representing a density of clouds in the frame. For example, the cloud density score can be determined based on the degree to which the clouds are clustered within the frame and/or an amount of area which occupied by the cloud within the frame. The cloud classification and the cloud density score are then provided as input to the fusion weight determination module 311. The classification module 309 is described in greater detail below in the forthcoming paragraphs.

In an embodiment, the fusion weight determination module 311 is configured to determine fusion weights for each frame based on the classified cloud classes and the confidence score for performing star trail fusion by the star trail fusion module 313. The fusion weight determination module 311 is described in greater detail below in the forthcoming paragraphs.

In an embodiment, the star trail fusion module 313 generates an astro-lapse video by fusing the at least one current frame and the set of subsequent frames based on the determined fusion weights received from the fusion weight determination module 311 at step 415, the corrected star shape, and the estimated star trajectory received from the transformation module 301 at step 417. The star trail fusion module 313 is described in greater detail below in the forthcoming paragraphs.

In an embodiment, the system 201 may include an image format convertor. The image format convertor may be configured to convert the images from a first format (for example, NV12/NV21 YuV interleaved (YUV 4-2-0)) to a second format (for example, YUV 444, red green blue (RGB)) to get more data per pixel to improve the image quality. The image format convertor results in video stream output that may be updated at an encoder (for video recording) and display (for video preview and recording). The video stream output may be sent in the format expected by a display encoder.

Each of the modules 213 is now described in greater detail in conjunction with FIGS. 5 through 12B.

Figure 5:
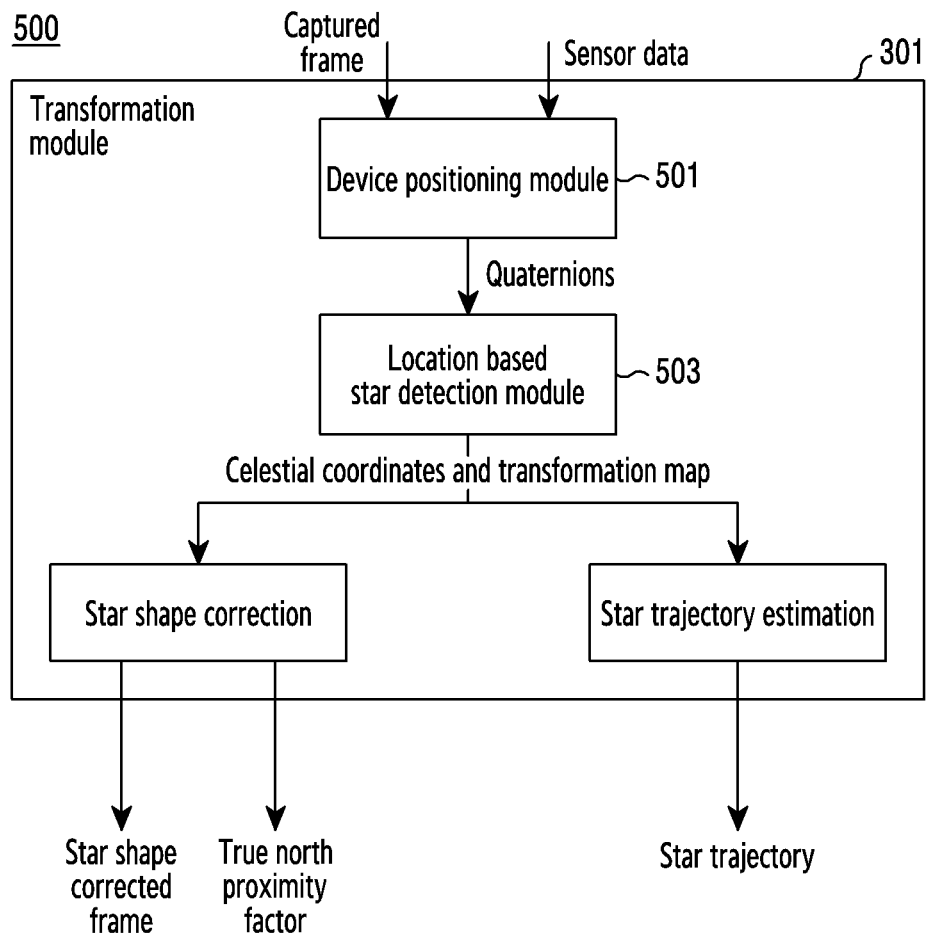
FIG. 5 is a block diagram depicting an exemplary implementation of the transformation module, according to an embodiment of the present disclosure.

FIG. 5 is a block diagram 500 depicting an exemplary implementation of the transformation module 301, according to an embodiment of the present disclosure. The transformation module 301 may be configured to generate star trajectory and perform star shape correction and trail adjustment based on a celestial position of the one or more stars in the captured frames. The transformation module 301 may utilize sensor data to determine the user device 101's pointing direction represented by a quaternion. For example, the user device 101's pointing direction may include a pointing direction of the camera 209 of the user device 101. The quaternion represents the rotation with respect to a predefined set of coordinate axes applied to the user device 101 to orient the camera 209 in a particular direction. Further, the transformation module 301 may determine the celestial coordinates of the one or more stars that are in the field of view (FOV) of the camera 209. The determined celestial coordinates are then used to estimate star trajectory and perform star shape correction. The transformation module 301 further comprises sub-modules such as a device positioning module 501 and a location-based star detection module 503.

The device positioning module 501 may be configured to determine representation of the user device 101's pointing direction in the form of quaternions and to detect the presence of global motion of the camera 209 relative to a scene or environment being captured. In an embodiment, the global motion of the camera 209 on user device 101 refers to an overall movement and orientation of the camera 209 in the three-dimensional space relative to a fixed reference point, such as the Earth's surface or an external object. The global motion may include translation (i.e., movement in space) and rotation (i.e., change in orientation) of the camera 209.

In the device positioning module 501, a predefined filter is used to fuse sensor data. The fusion is required to synchronize the sensor data with respect to timestamps, and correct inaccuracies in readings from one sensor based on readings from another sensor. For example, readings from the gyroscope are prone to inaccuracies caused by drifting of the user device 101. Said inaccuracies in the readings from the gyroscope may be corrected using readings from the accelerometer. In an exemplary embodiment, a Kalman filter may be used to fuse the sensor data.

Thereafter, exponential smoothing of filter output is performed, and the user device 101's pointing direction in the form of quaternions is obtained with the below reference axes:

x-axis: orthogonal to y and z axes and points approximately east;
y-axis: geomagnetic north pole (based on magnetometer's heading direction); and
z-axis: perpendicular to the ground (same as accelerometer z-axis).

Thereafter, the obtained quaternions are rotated and returned such that the y-axis points at true north instead of geomagnetic north. Said rotation is performed by applying a standard magnetic model, such as the world magnetic model (WMM)-2020, on the GPS coordinates of the user device 101 based on the readings from the GPS sensor.

Further, the device positioning module 501 may be configured to detect the presence of global motion by analyzing sensor fused data and GPS coordinates.

The location based star detection module 503 may be configured to determine the celestial coordinates of the one or more stars in the captured frames, in the manner discussed hereinafter. Further, the location based star detection module 503 may be configured to determine a celestial coordinate transformation map from pixels to celestial coordinates and vice-versa.

The location based star detection module 503 may be configured to determine the celestial coordinates of each pixel using the celestial coordinates of the center pixel of each frame and the FOV of the camera 209 and based on a predefined application programming interfaces (APIs).

Firstly, an altitude-azimuth (Alt-az) coordinate of the center pixel of each frame is calculated from the quaternion input from the device positioning module 501. According to embodiments of the present disclosure, the altitude represents the angle between the user device 101's pointing direction and horizon (x-y plane), and azimuth represents the angle between the user device 101's pointing direction and true north pole (y-axis). Said values are directly obtained from the quaternion. Thereafter, Right Ascension-Declination (RA-dec) coordinate conversion is performed based on equations (1), (2), and (3) below:

$$\tan H = \frac{\sin A}{\cos A \sin \varphi + \tan h \cos \varphi} \quad (1)$$

$$\alpha = \theta - H \quad (2)$$

$$\sin \delta = \sin \varphi \sin h - \cos \varphi \cos h \cos A, \quad (3)$$

where H: local hour angle, a: Right ascension, θ: local sidereal time, δ: declination, A: azimuth, h: altitude, q: latitude.

Thereafter, a set of predefined APIs based on flexible image transport system (FITS)-world coordinate system (WCS) is obtained. The FITS-WCS is a well-established standard to represent pixels of sky image into celestial coordinates. The set of predefined APIs use, for each frame, RA-dec coordinates of the corresponding center pixel, the FOV of the camera 209, and a predefined star magnitude threshold as inputs to provide the celestial coordinate transformation map of the one or more stars that are present in the FOV of the camera 209 and have a magnitude greater than the predefined star magnitude threshold. The predefined star magnitude threshold refers to the absolute magnitude, i.e., brightness of a star at 10 parsecs from an observer which can be computed using apparent magnitude (i.e., observed brightness from the earth) and distance from the observer to the star in parsecs.

Thus, assuming T is the transformation map returned by the set of predefined APIs, (x, y) is a pixel coordinate, and (Ra, Dec) is the celestial coordinate for the pixel (x, y), then T (x, y)=(Ra, Dec) and T' (Ra, Dec)=(x, y) are returned by the location-based star detection module 503.

The determined celestial coordinates of the one or more stars are used for correcting star shape associated with the one or more stars and determining trail length weights. Further, the determined celestial coordinates along with the celestial coordinate transformation map are used to estimate star trajectory associated with the one or more stars.

In the embodiments of the present disclosure, two issues related to star position in an Astrolapse video are addressed.

In the first issue, when looking at stars present in different sections of the sky, some stars appear to move faster than others. Such displacement occurs as the stars that are closer to true north and true south directions appear to move slower compared to the stars farther from the true north and the true south. Due to the long exposure for capturing the astro-lapse video, the stars that are away from the true north and the true south appear elongated. To address and mitigate the first issue, embodiments of the present disclosure describe the following steps:

Step 1: Detecting stars that are away from the true north and the true south based on the celestial position of the stars. For the detection of the stars that are away from the true north and the true south, angular separation between each star (whose celestial coordinates are determined), and the Polaris (i.e., the north star) are determined using the following equation (4):

$$\text{Angular Separation} = \cos^{-1}(\cos(90-Dec1)\cos(90-Dec2) + \sin(90-Dec1)\sin(90-Dec2)) \cos(RA1-RA2), \quad (4)$$

where
(RA1, Dec1)=celestial coordinates of the star; and
(RA2, Dec2)=(2 h 41 m 39 s,+89° 15' 51") which represents coordinates of the Polaris Step 2: Determining a true north proximity factor for each star based on the determined angular separation. The true north proximity factor is represented by a value between 0.0 and 1.0 and indicates how close or far each star is to the true north. The true north proximity factor 0.0 indicates no angular separation, i.e., at the Polaris, and the true north proximity factor 1.0 indicates 90 degrees angular separation, i.e., far from the Polaris.

Step 3: Sending proximity factor to the auto IQ correction module 307 via the focus and exposure determination module 305 such that subsequently captured frames have exposure and focus adjusted based on the true north proximity factor. Sending proximity factor to the auto IQ correction module 307 enables a reduction in elongation to some extent.

Step 4: Performing in-frame elongation correction. Since the ideal star shape is circular but the elongated star shape is elliptical, the star pixels and star elongation pixels may be corrected in the following manner:

If (x, y) denotes a center pixel of the star, the intensity of pixels (x+I, y), (x−i, y), (x, y+i), and (x, y−i) pixels is determined, where i=1, 2, 3, and so on. If any of the said pixels have an intensity lower than a predefined tunable threshold, the $i^{th}$ value of said pixel is taken as a radius of the star. For the other nearby pixels that lie outside the radius, either the intensity of the pixels is decreased such that elongation is dampened or the pixels are replaced with nearby background pixels.

Figure 6:
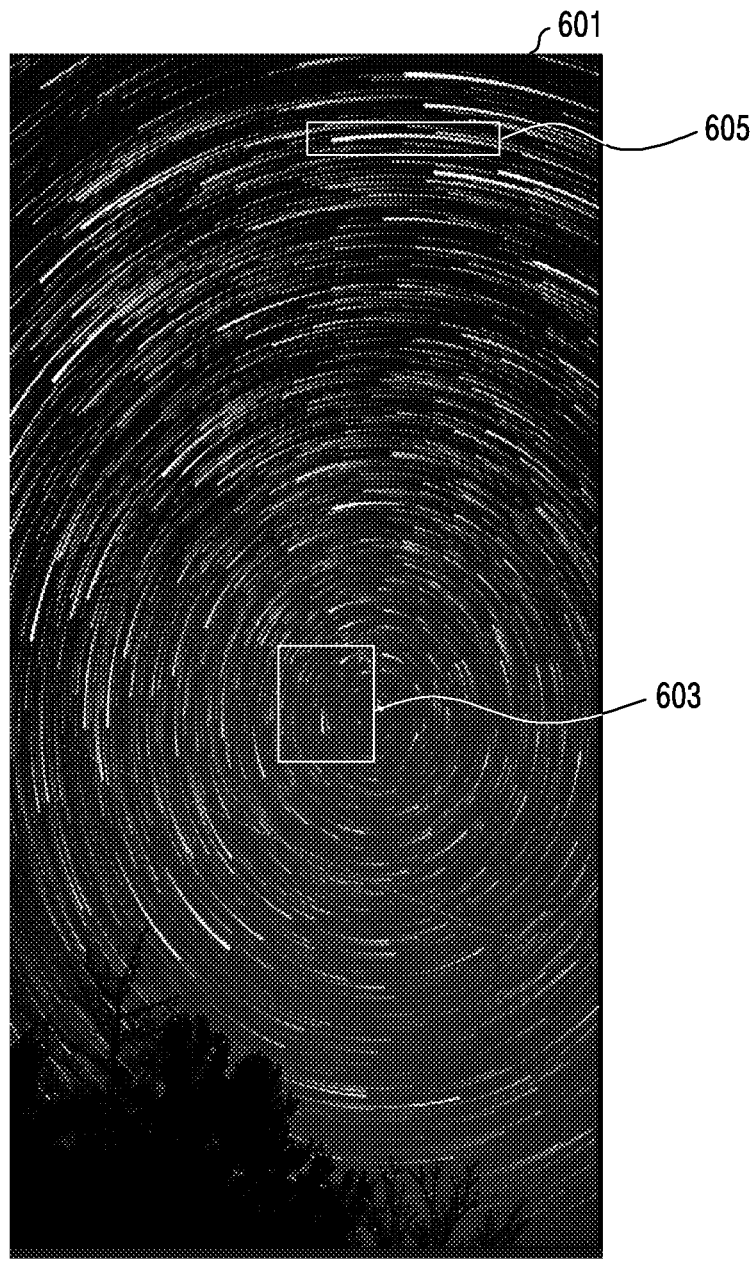
FIG. 6 is a pictorial diagram depicting the appearance of stars based on proximity to the true north in an exemplary captured frame, according to an embodiment of the present disclosure.

In the second issue, when fusing the captured frames with stars that are at different distances from the true north and south, the trail length sometimes appears longer while sometimes shorter. FIG. 6 is a pictorial diagram 600 depicting the appearance of stars based on proximity to the true north in an exemplary captured frame 601. As shown in the figure, the stars closer to true north have small trails as depicted in block 603 and the stars farther from true north have long trails as depicted in block 605. Such inconsistency in trail lengths is caused because static fusion weights used during the fusing of the captured frames do not consider the speed of stars into account. To address and mitigate the second issue, a trail length weight is assigned to each star in a corresponding frame based on the determined angular separation.

Figure 7:
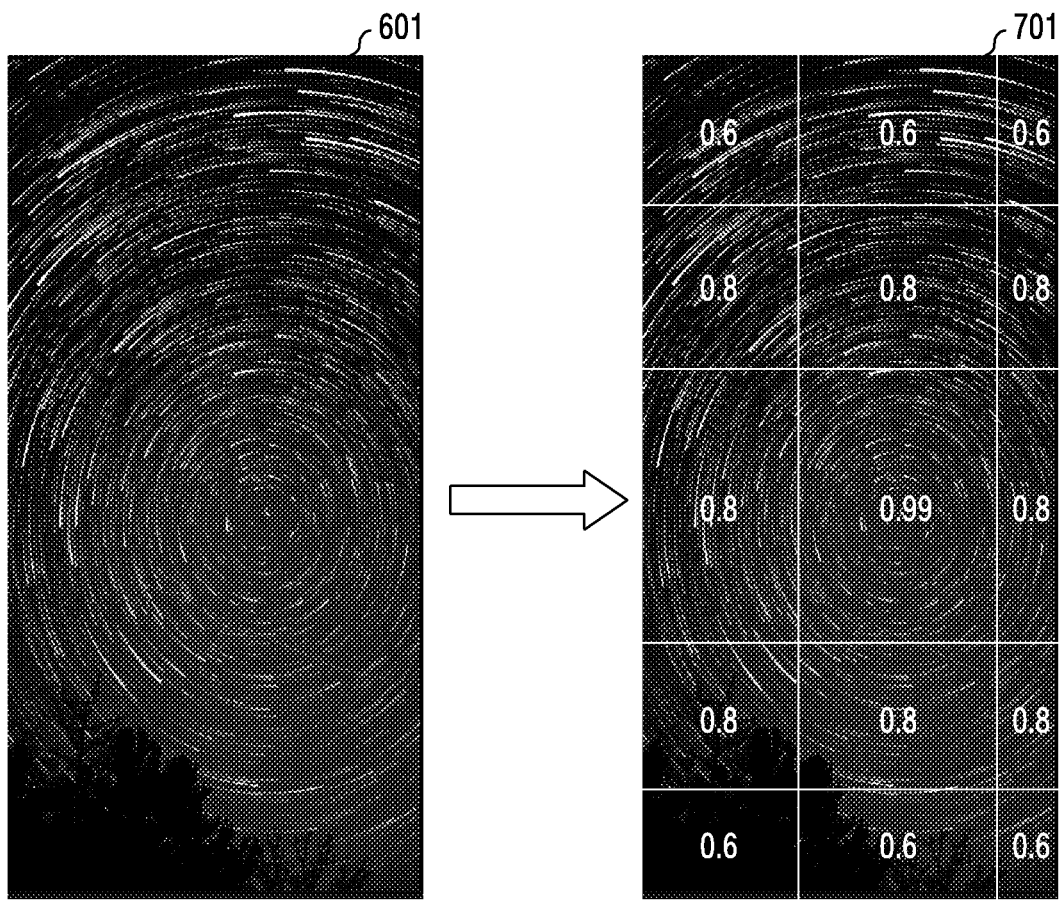
FIG. 7 is a pictorial diagram illustrating an exemplary assignment of trail length-weight to the stars in the exemplary captured frame, according to an embodiment of the present disclosure.

FIG. 7 is a pictorial diagram 700 illustrating an exemplary assignment of trail length-weight to the stars in the exemplary captured frame 601, according to an embodiment of the present disclosure. According to embodiments of the present disclosure, the trail length weight, to be used during the fusion, may be assigned as follows:

For angular separation between 0 to 35 degrees, a high trail length weight of 0.99 may be assigned;

For angular separation between 35 to 60 degrees, a medium trail length weight of 0.80 may be assigned; and For angular separation between 60 to 90 degrees, a low trail length weight of 0.60 may be assigned.

According to embodiments of the present disclosure, the high trail length weight causes the stars to remain in subsequent fused frames for a longer duration, resulting in an increased trail length. On the contrary, the low trail length weight has the opposite effect resulting in a uniform trail length. Besides, correcting star shape and determining trail length weights, the celestial coordinates determined by the location based star detection module 503 along with the celestial coordinate transformation map are used to estimate star trajectory associated with the one or more stars. Star trajectory estimation is described in greater detail below in conjunction with FIG. 8.

Figure 8:
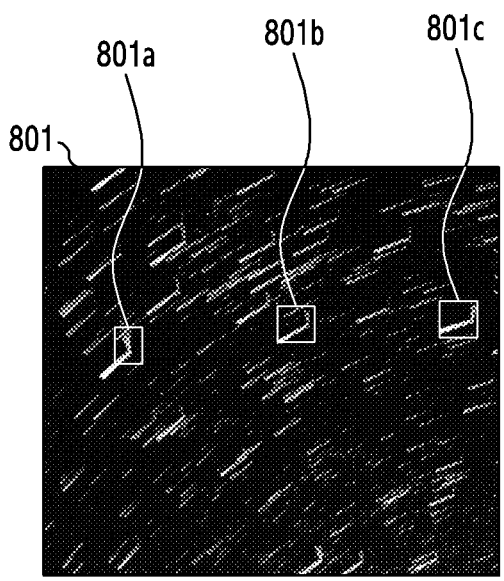
FIG. 8 is a pictorial diagram illustrating an exemplary star trail correction based on star trajectory estimation, according to an embodiment of the present disclosure.
Figure 8:
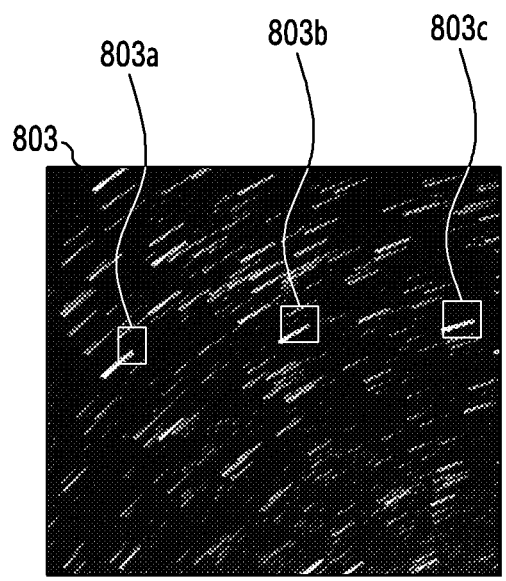

FIG. 8 is a pictorial diagram 800 illustrating an exemplary star trail correction based on star trajectory estimation, according to an embodiment of the present disclosure. According to embodiments of the present disclosure, the celestial coordinates of the one or more stars, the celestial coordinate transformation map, and information associated with the presence of global motion are used for estimating the star trajectory of the one or more stars in the captured frames. In an embodiment, the information associated with the presence of global motion and the star trajectory estimation enables the determination of whether to skip fusion of a particular frame and draw trails using the estimated star trajectory, or reset fusion based on the global motion detection. Embodiments of the present disclosure address two main issues associated with the presence of global motion during the capturing of the astro-lapse video. The two main issues are described as follows:

Due to long exposure, the given frame itself can have an undesired light trail.

If the frame with global motion is used for fusion, resulting star trails may look non-uniform, as depicted by blocks 801a-801c in an exemplary frame 801 with global motion which depicts a part of the background problem. Said background problem depicted in frame 801 is corrected by star trail correction, according to an embodiment of the present disclosure, and is depicted by blocks 803a-803 in frame 803.

Thus, the frames captured during global motion are skipped during fusion.

When the global motion of the camera 209 finishes, the two most common cases that arise are described below:

Case 1: After the global motion finishes, the camera 209 may point at a different section of the sky. Alternatively, the camera 209 may point at the same section of the sky but different orientation as compared to the orientation before the global motion. In the present case, a complete reset of trails may be required because using previous trails may cause random overlapping trails in different directions, resulting in an undesired star trail output.

Case 2: After the global motion finishes, the camera 209 may point at the same section of sky with the same orientation as that before the global motion. In such case, a complete reset of trails may not be required because new trails are a continuation of old trails. However, due to the global motion, few frames may be skipped in between resulting in gaps between old trails and new trails. Such gaps may be filled by drawing trails using an estimated star trajectory.

A process for estimating star trajectory stores celestial coordinates of all stars in the captured frames to detect global motion in subsequent frame and determine whether to skip fusion or reset fusion after global motion is finished. The process for estimating star trajectory comprises the following steps:

Step 1: From previously-stored celestial coordinates, calculate (Alt-az) coordinates of all the stars. First, calculate local side real time (θ) using equation (5) below. Based on θ, calculate coordinates based on the below mentioned equations (6), and (7).

$$\theta = 100.460618 + 0.985647(JD) + L + 15 \cdot UT \quad (5),\text{ where}$$

θ: Local side real-time
JD: Julian Days, which is the number of days since Jan. 1, 2000
L: Longitude
UT: Universal timeH=θ−α

$$h = \sin^{-1}(\sin\delta \sin\varphi + \cos\delta \cos\varphi \cos H) \quad (6)$$

$$A = \frac{\sin h \sin\varphi - \sin\delta}{\cos h \cos\varphi}, \quad (7)$$

where H: local hour angle, a: Right ascension, θ: local sidereal time, δ: declination, A: azimuth, h: altitude, φ: latitude Step 2: From the current celestial coordinates input, calculate the (Alt-az) coordinates of all stars using the procedure described in step 1.

Step 3: Compare the (Alt-az) coordinates obtained in the above two steps. When the compared coordinates do not match, it indicates the presence of global motion as determined by image-based global motion detection. Said indication along with input from sensor-based global motion detection, accurately detects the presence of global motion.

In an embodiment, if the presence of global motion is detected, a signal to skip the fusion of current frame is generated. In an alternate embodiment, if the presence of global motion is not detected in the current frame but was detected in the previous frame then the aforementioned two cases are checked.

Step 4a: Calculate (Alt-az) coordinates of all the stars based on the celestial coordinates of stars stored just before global motion.

Step 4b: Compare the (Alt-az) coordinates calculated at step 4a with the (Alt-az) coordinates calculated in Step 2.

Step 4c: if the (Alt-az) coordinates compared at step 4b do not match, it corresponds to the case 1, and a signal to resent fusion is generated. Alternatively, if the (Alt-az) coordinates compared at step 4b do match, it corresponds to the case 2, and the fusion is continued.

Step 5: Using celestial coordinate transformation map input (T, T') obtained from the location-based star detection module 503 and the celestial coordinates of stars (Ra, Dec), the pixel locations (x, y) of each star are obtained. The pixel locations of each star may then be used to draw the trails when fusion is skipped or when colored trails are to be generated.

Thus, the transformation module 301 takes as input captured frames and sensor data, and results in star shape corrected frames, estimation of star trajectory, and determination of true north proximity factor. Besides the transformation module, 301, the input of the captured frame is also used by the segmentation module 303, as described below in the forthcoming paragraphs in conjunction with FIG. 9.

Figure 9:
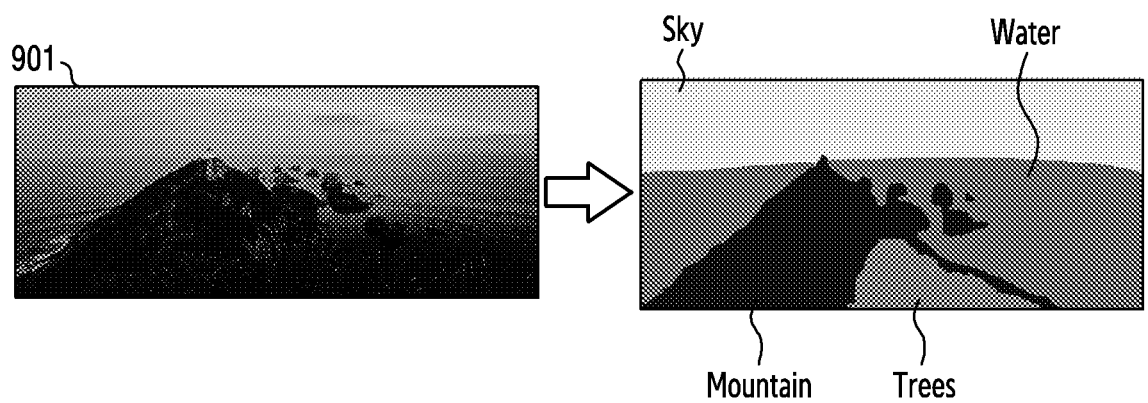
FIG. 9 is a pictorial diagram depicting an exemplary segmentation by the segmentation module, according to an embodiment of the present disclosure.

FIG. 9 is a pictorial diagram 900 depicting an exemplary segmentation by the segmentation module 303, according to an embodiment of the present disclosure. In an embodiment, the segmentation module 303 may be configured to perform frame segmentation for at least one of the at least one current frames and the set of subsequent frames by segmenting the corresponding frame into one or more areas and classifying each area into one or more objects. The segmentation may be performed using predetermined fully convolutional networks. In an embodiment, the one or more objects may correspond to the type of area depicted in the corresponding frame. For example, the one or more objects may include, but are not limited to, sky, mountain, river, lighthouse, birds, airplanes, and rocks. FIG. 9 depicts segmentation of an exemplary frame 901 into one or more objects such as sky, water, mountain, and trees.

In an embodiment, the segmentation module 303 determines segmentation information comprising identification of the preferred type of area and one or more non-preferred types of areas from the one or more segmented areas based on the classification of the one or more segmented areas. For example, the sky may be identified as the preferred type of area while mountains, rivers, lighthouses, birds, airplanes, and rocks may be identified as the non-preferred type of area. Additionally, each pixel in the corresponding frame may be identified as being a part of an object class. Said information may be used later by the auto IQ correction module 307. Moreover, the segmentation information and the captured frames are forwarded to the focus and exposure determination module 305 as described below in conjunction with FIGS. 10A and 10B.

Figure 10A:
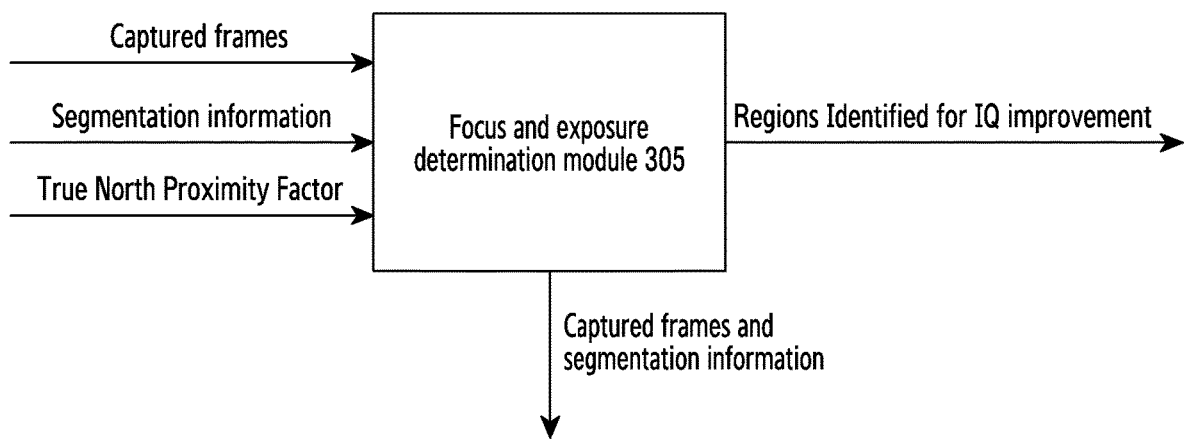
FIG. 10A is a block diagram depicting the focus and exposure determination module, according to an embodiment of the present disclosure.
Figure 10B:
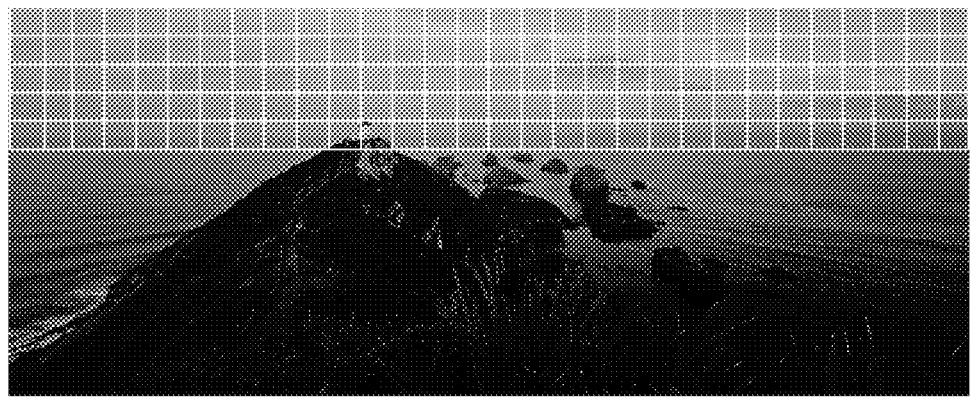
FIG. 10B is a pictorial diagram illustrating the division of the preferred type of area by depicting the focus and exposure determination module, according to an embodiment of the present disclosure.

FIG. 10A is a block diagram 1000a depicting the focus and exposure determination module 305, according to an embodiment of the present disclosure. FIG. 10B is a pictorial diagram 1000b illustrating division of the preferred type of area by the focus and exposure determination module 305, according to an embodiment of the present disclosure. In an embodiment, the focus and exposure determination module 305 may be configured to determine one or more regions in the captured frames with a degree of exposure and focus being one of greater or less than the predefined threshold. For, example, the focus and exposure determination module 305 may be configured to determine one or more regions with a degree of exposure being one of greater or less than a predefined threshold. For, example, the focus and exposure determination module 305 may be configured to determine one or more regions corresponding to an object for adjusting a focus, when a size of an area occupied by the object to be focused is one of greater or less than a predefined threshold. For, example, the focus and exposure determination module 305 may be configured to determine one or more regions with a degree of exposure and a degree of an area occupied by a focused object being one of greater or less than a predefined threshold. In an embodiment, the degree of exposure and focus may be determined based on the frame segmentation and the true north proximity factor associated with the one or more stars in the captured frames.

For determining the one or more regions, the focus and exposure determination module 305 divides the preferred type of area into a plurality of blocks and compares a brightness of each block with the average brightness of the plurality of blocks to obtain the degree of exposure and focus. Finally, the one or more regions are determined corresponding to one or more blocks with the degree of exposure and focus being one of greater or less than the predefined threshold.

In the focus and exposure determination module 305, the preferred type of area is divided into a plurality of blocks. In an exemplary embodiment, when the sky (i.e., the preferred type of area) occupies a region less than 50% of the captured frame, the preferred type of area may be divided into a finer grid of blocks, as depicted in FIG. 10B, such that the width and height of each block is less than 200 pixels. In another exemplary embodiment, when the sky occupies a region more than 50% of the captured frame, the preferred type of area may be divided into a coarse grid of blocks such that the width and height of each block exceeds 200 pixels.

Thereafter, an individual block is determined to be under-exposed or over-exposed by comparing the brightness of each block with an average brightness of the plurality of blocks and determining the one or more regions corresponding to one or more blocks with the degree of exposure and focus being one of greater or less than the predefined threshold. In an exemplary embodiment, if the brightness of the individual block is less than the average brightness of the plurality of blocks by the predefined threshold such as 20%, then the individual block is determined to be under-exposed. In another exemplary embodiment, if the brightness of the individual block is greater than the average brightness of the plurality of blocks by the predefined threshold such as 20%, then the individual block is determined to be over-exposed.

In an alternate embodiment, if a non-preferred type of area comprising objects such as a mountain or a tree occupies a major portion such as more than 70% of the frame, then the objects are considered to be important in the context of the scene. In such scenarios, the focus may be shifted to the object in place of the sky. In yet another scenario where the object moves out of the frame, for example in the case of a car, the focus may switch back to the sky.

The focus and exposure determination module 305 may calculate the optimal exposure and focus on a frame-by-frame basis in the preferred type of area. The frame-by-frame calculation is performed since the same scene may have different exposure in the preferred type of area (sky) as the astro-lapse video progresses.

In an embodiment, the exposure and focus value of a block may be corrected when the brightness variance of the block from the average brightness of the frame is high. In other scenarios, the exposure and focus value (and as a result, exposure time) may be changed. For example, when the stars are away from true north and true south, then elongation of stars may occur due to long exposure since these stars appear to be moving faster than usual. To counter the elongation effect to some extent, the exposure time may be decreased depending on the true north proximity factor.

In one embodiment, the output of the focus and exposure determination module 305, i.e., the one or more identified regions are provided to the auto IQ correction module 307.

In the auto IQ correction module 307 module, for each block of the one or more identified regions, a gain value is calculated based on deviation from the average brightness of the plurality of blocks. The gain value may be computed as follows:

For an under-exposed block, gain value=1+(average brightness of the plurality of blocks−the brightness of the under-exposed block)/256.

For an over-exposed block, gain value=1−(average brightness of the plurality of blocks−brightness of the under-exposed block)/256.

The determined gain values are sent to the HAL 211 to improve the exposure and focus of the identified one or more regions in the subsequent frames.

In an embodiment, the weights used for each block may be dynamically adjusted on a frame-by-frame basis. According to embodiments of the present disclosure, the weights refer to the threshold values associated with exposure and focus which are set per block to achieve image quality improvement. For example, certain areas of a frame such as trees and mountains may be over exposed depending on the time of day and direction of a light source. According to the embodiments of the present disclosure, a weighted metering technique may be used to dynamically adjust the exposure of such regions ensuring that the regions do not appear excessively bright and close to the average brightness of the plurality of blocks.

In a general working scenario, when the sky occupies a larger part of the frame, the focus is kept at infinity. However, if a certain object occupies a large part of the frame (greater than 70%), the focus is shifted from infinity to the finite distance at which the object is. The custom-weighted metering technique is used, and the average exposure is computed for the fixed blocks in the entire frame. Based on the semantic segmentation module 303 output, when the sky is determined as the preferred type of area, the custom-weighted metering technique is used for the sky area.

Figure 11:
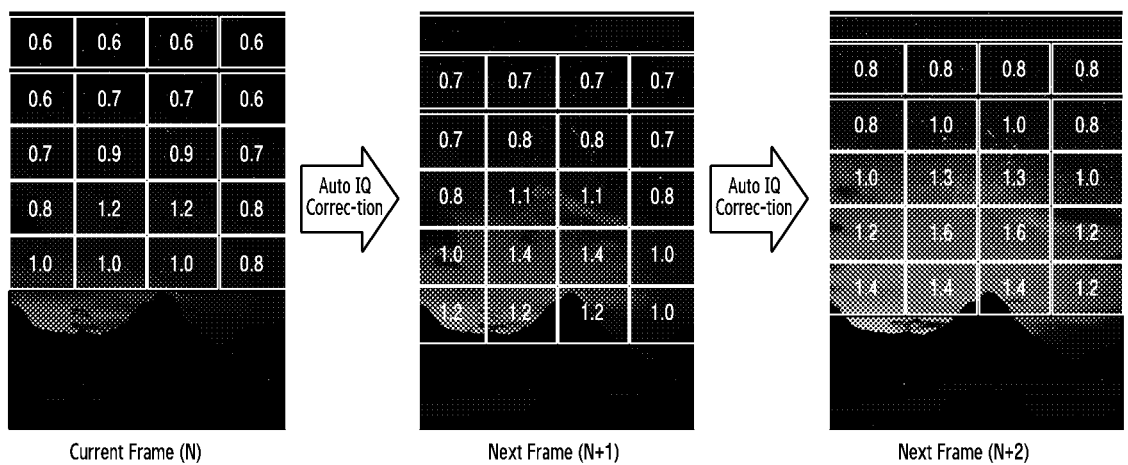
FIG. 11 is a pictorial diagram depicting the image quality improvement of one or more regions over successive frames, according to an embodiment of the present disclosure.

FIG. 11 is a pictorial diagram 1100 depicting the IQ improvement of the one or more regions over successive frames, according to an embodiment of the present disclosure. According to embodiments of the present disclosure, exposure in each block is considered and the entire region is iteratively enhanced over successive frames by increasing the average exposure by a predetermined value such as around 30% compared to the entire frame. In such a case, the custom-weighted metering technique may be implemented to enhance the exposure values of the sky regions to achieve better exposure iteratively.

In another embodiment, the output of the focus and exposure determination module 305 forwards the captured frames and segmentation information received from the segmentation module 303 to the classification module 309.

The classification module 309 may be configured to classify each block of the corresponding frame into one or more cloud categories such as clear sky, partly cloudy, and overcast. Further, the classification module 309 may determine, for each cloud category, a cloud density score. The cloud density score may be a value representing a density of of clouds in the frame. For example, the cloud density score can be determined based on the degree to which the clouds are clustered within the frame and/or an amount of area which occupied by the cloud within the frame.

To identify the different cloud categories from the input frame, the classification module 309 converts the input frames into feature vector representation with a rectified linear unit activation function. Thereafter, the classification module 309 concatenates generated feature vectors for the final feature vector and classifies the input frames clear sky, partly cloudy, and overcast. In an embodiment, the classification module 309 may be implemented using the predetermined fully convolutional neural network. The network may be a cloud net model which is an artificial intelligent model being trained for classifying each block of the input frame into multiple cloud classes. The network may predict cloud classes for all the blocks in the input frame. Further, for each predicted class, the network may also determine the cloud density score. For example, when the frame is applied to the cloud net model, and information representing frame classification with classes as clear sky, partly cloudy, overcast and confidence score is output by the cloud net model. For example, the input frames are converted to feature vector representation with a rectified linear unit activation function, the generated feature vectors are concatenated for the final feature vector and the input frames are classified into classes clear sky, partly cloud, and overcast. Further, the network of the cloud net model may predict cloud classes for all the blocks in the input frames. For each predicted class, the cloud density score will be determined by the cloud net model. For, example, the input frames are fed to the cloud net model which classifies the input frames into classes such as clear sky, partly cloud and overcast. For each dynamically divided small blocks in the input frames, cloud density score will be determined by the cloud net model for all predicted classes. Based on the cloud classification and the cloud density score, the fusion weights for the corresponding frames are determined by the fusion weight determination module 311.

The fusion weight determination module 311 may be based on a multi linear regression neural network model that predicts custom fusion weights for star trail fusion. The multiple linear regression neural network model is used for predicting the custom fusion weights for the input frames. Based on the input frame features and the cloud density scores, the model will determine the custom fusion weights for each dynamically divided small blocks in the frames. The steps followed by the fusion weight determination module 311 to determine the custom fusion weights are described as follows:

Step 1: Initially the input frame is dynamically divided into multiple blocks. These input features are represented as $X_1, X_2, \ldots X_n$.

Step 2: Using the cloud classification, the cloud density score for each blocks of the frame is determined. These density scores are represented as $W_1, W_2 \ldots W_n$.

Step 3: Training the multi-linear regression neural network model based on known training data of custom fusion weights and various input images.

Step 4: Inputting training images contain a mixture of various images with clear sky, partially cloud, overcast, mountain with clouds, trees with clouds and etc.

Step 5: Inputting custom fusion weights data based on manually annotated data for various training images mentioned above.

Step 6: Analyzing, by the model, the relationship between multiple input image features and a cloud density score for predicting the custom fusion weights.

Step 7: Predicting custom fusion weight by training the model based on the following equation: $Y = W_0 + W_1 X_1 + W_2 X_2 + \ldots + W_n X_n$, where $W_0$: default start weight (0.6) and will be a constant weight when weights ($W_1 \ldots W_n$) are zero (assuming the sky is completely clear of clouds).

According to embodiments of the present disclosure, the astro-lapse video may be generated by fusing, by the star trail fusion module 313, the at least one current frame and the set of subsequent frames based on the determined fusion weights, the corrected star shape, and the estimated star trajectory. The star trail fusion module 313 comprises night fusion mode and color fusion mode and generates the astro-lapse video either in night fusion mode or the color fusion mode based on an input received from a user.

For generating the astro-lapse video in night fusion mode, the star trail fusion module 313 performs the following steps:

Step 1: Firstly, shape-corrected video frames (current frames) are represented as F1, F2, F3 . . . Fn and previous frames are represented as P1, P2, P3 . . . Pn.

Step 2: Initially the current frame F1 may be directly encoded to the output buffer and considered as previous frame P1 for the next frame.

Step 3: Next frame F2 is custom alpha blended with the output of previous frame P1 and the output for the current frame F2 is considered as P2.

Step 4: Next frame F3 is custom alpha blended with the output of the previous frame P2 and output for the current frame F3 is considered as P3.

Step 5: All the output frames P1, P2, P3 . . . Pn are encoded into the output buffer and the buffer format is converted and saved as a video file.

For generating the astro-lapse video in color fusion mode, the star trail fusion module 313 performs the following steps:

Step 1: Firstly, shape-corrected video frames (current frames) are represented as F1, F2, F3 . . . Fn. And previous frames are represented as P1, P2, P3 . . . Pn.

Step 2: Initially a color map is applied to current frame F1 based on estimated star trajectory and directly encoded to the output buffer and considered as previous frame P1 for the next frame.

Step 3: For the next frame F2, the color map is applied, and custom alpha is blended with the output of the previous frame P1, and the output for the current frame F2 is considered as P2.

Step 4: For the next frame F3, the color map is applied, and custom alpha is blended with the output of the previous frame P2, and the output for the current frame F3 is considered as P3.

Step 5: All the output frames P1, P2, P3 . . . Pn are encoded into the output buffer and the buffer format is converted and saved as a video file.

To apply the color map to the determined star trajectory for star trail color fusion, trajectory data determined from the star trajectory estimation module outputs a matrix which is in the form of a binary matrix where the value is 1 for the new star position and 0 for others. Thereafter, input frame source pixel locations X are identified using a star trajectory binary matrix. Thereafter, random color maps or random color values are applied to source pixel locations X. In an embodiment, a color map frame may be generated by multiplying input pixel brightness with random color values and normalized in the range (0,255), such that Output($Y(x,y)$)=normalized(Input($X(x,y)$)*random color value). In an example, random color values:

color values for green (0,255,0)
color values for red (255,0,0)
color values for blue (0,0,255)

The above operation may be performed for all determined pixel locations. Post this process custom alpha blending may be applied.

Figure 12A:
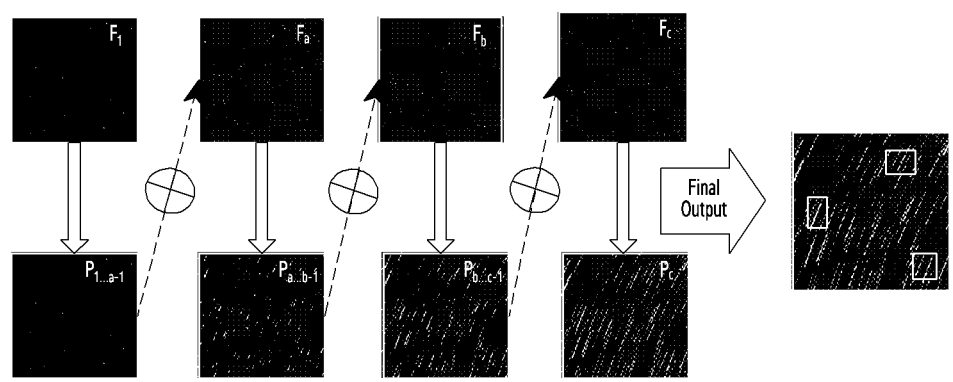
FIG. 12A is a pictorial diagram depicting an exemplary implementation of the custom alpha blending technique for a long star trail, according to an embodiment of the present disclosure.
Figure 12B:
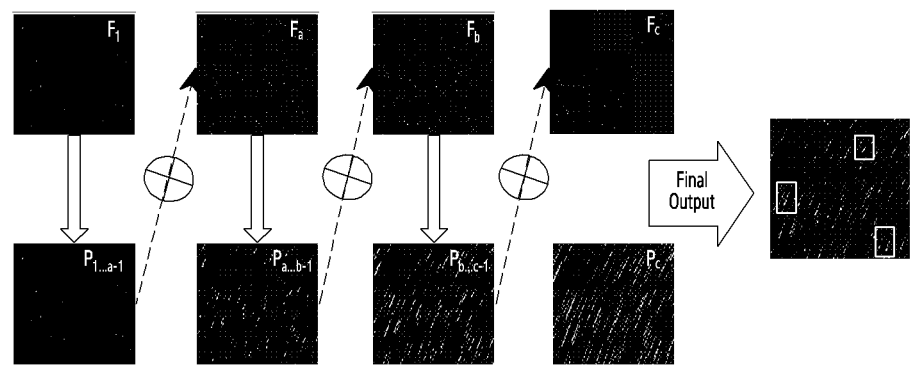
FIG. 12B is a pictorial diagram depicting an exemplary implementation of the custom alpha blending technique for short star trail, according to an embodiment of the present disclosure.

FIG. 12A is a pictorial diagram 1200a depicting an exemplary implementation of custom alpha blending technique for resulting in a long star trail, according to an embodiment of the present disclosure. FIG. 12B is a pictorial diagram 1200b depicting an exemplary implementation of custom alpha blending technique for resulting in a short star trail, according to an embodiment of the present disclosure. The custom alpha blending method blends the captured frames comprising the at least one current frame and the set of subsequent captured frames with determined custom fusion weights and trail length weights. Based on the user input, shape corrected video frames or star color map frames are blended with determined weights. Based on the determined fusion mode from the star trajectory estimation module, following fusion operations may be triggered:

- if skip fusion: any frame that has global motion is skipped will be ignored while fusing
- if reset fusion: if a particular star location does not return to its original position after global motion is detected then reset
- otherwise: fuse Generally blending operation is performed based on the equation (8):

$$g(x) = \text{alpha} * (f0(x)) + \text{beta} * (f1(x)) + \text{gamma}, \quad (8)$$

where g(x)=output frame, f0(x)=previous frame, f1(x)=current frame, where alpha, beta(=1−alpha), gamma=constant weight value, where, $x \in$ Frames 1 to n The constant weight value used in the equation (8) is generally set to constant weight, which do not vary depending on the local features of a frame. The constant weight value is used for all the pixels in a frame. However, embodiments of the present disclosure, describe determining the dynamically varying fusion weights based on two aspects, as follows:

Custom fusion weights—based on local image features
Trail length weights—based on the angular separation Therefore, a modified equation (9) for performing custom blending operations, according to the embodiments of the present disclosure, becomes:

$$g(x, k) = \text{alpha}(x, k) * f0(x, k) + \text{beta}(x, k) * f1(x, k) + \text{gamma}(x, k) \quad (9)$$

where alpha(x, k): average of custom fusion weights and trail length weights,
beta(x, k): (1−alpha(x, k)),
gamma(x, k): average of (alpha(x,k), beta(x,k)),
$x \in$ Frames 1 to n, and k E dynamic blocks 1 to m in a frame.

In some embodiments, alpha(x, k) may be a combination of custom fusion weight and trail length weight.

The method 1300 for generating an astro-lapse video on the user device is described below in conjunction with FIG. 13.

Figure 13:
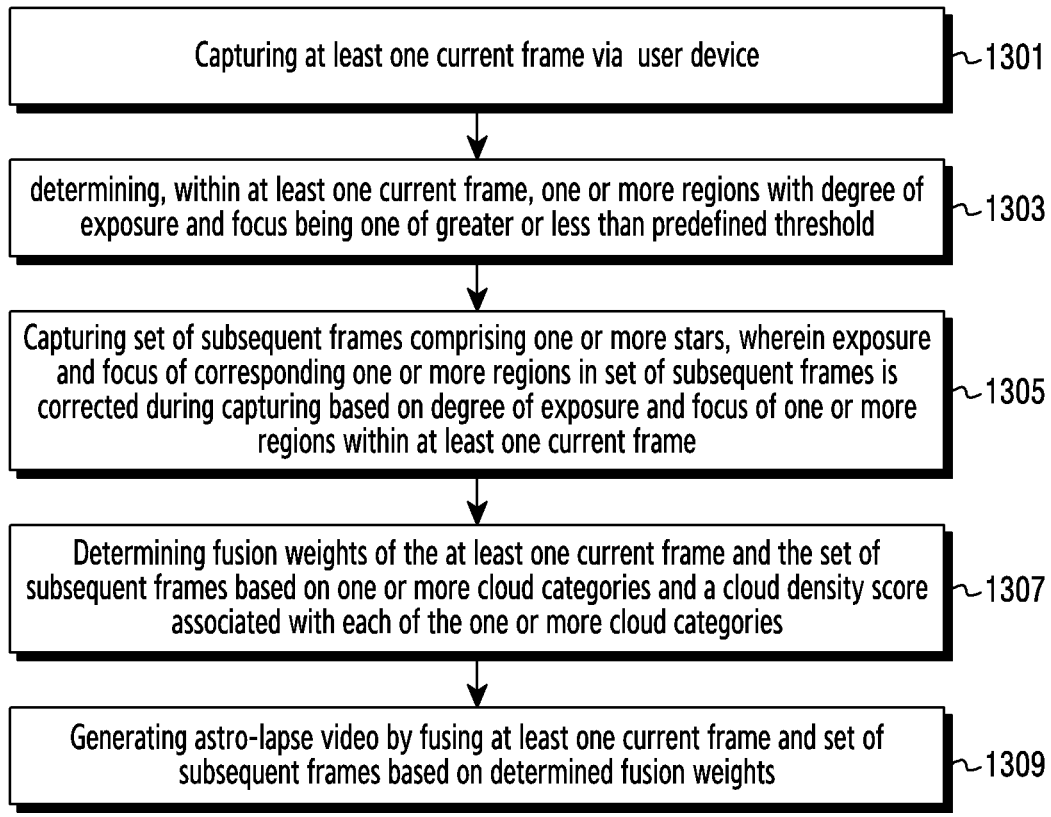
FIG. 13 illustrates an exemplary process flow of a method for generating an astro-lapse video on a user device, according to an embodiment of the present disclosure.

FIG. 13 illustrates an exemplary process flow of a method 1300 for generating an astro-lapse video on a user device, such as the user device 101, according to an embodiment of the present disclosure. In one embodiment, the steps of the method 1300 may be performed by the system 201, for instance, by the processor 203 of the system 201 in conjunction with the modules 209 and the memory 205.

At step 1301, at least one current frame is captured via the user device. The at least one current frame comprises one or more stars. The at least one current frame is obtained by capturing the one or more stars by the camera of the user device.

At step 1303, one or more regions with a degree of exposure and focus being greater or less than a predefined threshold are determined within the at least one current frame. The one or more regions within the at least one current frame are determined based on the degree of exposure and focus. In some embodiments, the degree of exposure and focus is determined based on frame segmentation and a true north proximity factor associated with the one or more stars in the at least one current frame.

In some embodiments, the degree of exposure and focus is determined based on frame segmentation and a true north proximity factor associated with the one or more stars in the at least one current frame. In some embodiments, the method 1300 may further comprise performing the frame segmentation for at least one of the at least one current frame and the set of subsequent frames. The frame segmentation may include segmenting the corresponding frame into one or more areas and classifying each area into one or more objects. In some embodiments, the method 1300 may further comprise identifying a preferred type of area and one or more non-preferred types of areas from the one or more segmented areas. Further, the method 1300 may comprise dividing the preferred type of area into a plurality of blocks. Further, the method 1300 may comprise comparing the brightness of each block with an average brightness of the plurality of blocks to obtain the degree of exposure and focus. Further, the method 1300 may comprise determining, based on the comparison, the one or more regions corresponding to one or more blocks with the degree of exposure and focus being greater or less than the predefined threshold.

At step 1305, a set of subsequent frames comprising the one or more stars are captured. The set of subsequent frames are obtained by capturing the one or more stars via the camera of the user device. The exposure and focus of corresponding one or more regions in the set of subsequent frames are corrected during the capturing based on the degree of exposure and focus of the one or more regions within the at least one current frame.

At step 1307, fusion weights of the at least one current frame and the set of subsequent frames are determined based on one or more cloud categories and a cloud density score associated with each of the one or more cloud categories.

In some embodiments, the method 1300 may comprise classifying each block of the corresponding frame into one or more cloud categories. Further, the method 1300 may comprise determining, for each cloud category, the cloud density score. Furthermore, the method 1300 may comprise determining the fusion weights for the corresponding frames, based on the cloud classification and the cloud density score.

At step 1309, an astro-lapse video is generated by fusing the at least one current frame and the set of subsequent frames based on the determined fusion weights. In some embodiments, to generate the astro-lapse video, the method 1300 may further comprise correcting a star shape associated with the one or more stars and estimating a star trajectory associated with the one or more stars. Further, the method 1300 may comprise generating the astro-lapse video by fusing the at least one current frame and the set of subsequent frames based on the determined fusion weights, the corrected star shape, and the estimated star trajectory.

In some embodiments, for correcting the star shape, the method 1300 may comprise correcting a shape of at least one star of the one or more stars in the at least one current frame and the set of subsequent frames to obtain a plurality of star shape corrected frames. Further, the method 1300 may comprise assigning trail length weight to each star in a corresponding frame based on an angular separation. Further, the method 1300 may comprise estimating, for each star in the corresponding frames, a star trajectory based on the celestial positioning information of the one or more stars. Moreover, the method 1300 may comprise obtaining a pixel location of each star in the corresponding frames based on the determined celestial positioning information of the respective star and a transformation map associated with celestial positioning information of the one or more stars.

In some embodiments, the method 1300 may comprise correcting a star trail of at least one star of the one or more stars, based on a corresponding star trajectory of the one or more star trajectories, to obtain a plurality of star trail corrected frames. In some embodiments, the method 1300 may comprise fusing the at least one current frame and the set of subsequent frames, using a custom alpha blending technique, based on the plurality of star shape corrected frames, corresponding trail length weight, the plurality of star trail corrected frames, and the determined fusion weights.

In some embodiments, the method 1300 may comprise providing, to a camera hardware abstraction layer (HAL) of the user device, information associated with the one or more regions having the exposure and focus being one of greater or less than the threshold degree of exposure and focus. Further, the method 1300 may comprise correcting the degree of exposure and focus of the determined one or more regions in a set of subsequent frames captured by the camera.

While the above discussed steps in FIG. 13 are shown and described in a particular sequence, the steps may occur in variations to the sequence in accordance with various embodiments. Further, a detailed description related to the various steps of FIG. 13 is already covered in the description related to FIGS. 1-12B and is omitted herein for the sake of brevity.

In additional embodiments of the present disclosure, a user device, and a method for capturing astro-lapse video in real-time are provided. The user device may be a mobile device equipped with at least one camera and a configurable camera pipeline. The mobile device may include a mobile phone, tablet, or the like. The user device may also include different sensors with different exposure capabilities. Said sensors may be used for capturing wide-angle images and teleimages based on the exposure capabilities. The different sensors may include GPS sensor. The GPS sensor data may be used to determine longitude and latitude data. The longitude and latitude data may be used to detect true north and true south thereby maintaining the shape of the fusion objects. The user device may also include inertial sensors to eliminate false motions. Eliminating false motions enables the generation of accurate star trails.

The method for capturing astro-lapse video in real time may include capturing the multiple astro-lapse images of the night sky with a click of a button. The astro-lapse images may be captured with and without fusion mode. The speed of capturing images may be adjusted based on use case requirements. Further, astro-lapse recording may be captured at different resolutions such as, but not limited to, Full High definition (FHD), or Ultra High Definition (UHD).

At least by virtue of the aforesaid, the present subject matter at least provides the following advantages:

The method described in the embodiments herein enables features in the user device to capture astro-lapse video with a click of a button.

Further, the method described in the embodiments herein enables handling multi-stage processing in real-time with robustness to parameters including time of capture, brightness, global motion, etc.

Further, the method described in the embodiments herein provides a real-time pipeline primarily for auto IQ improvements, fusion weight determination, and star trail fusion.

Further, the method described in the embodiments herein provides adaptive IQ configuration for astro-lapse mode, which sets exposure time, ISO (i.e., sensitivity of the camera's image sensor to light), and focus based on per-frame semantic analysis.

Further, the method described in the embodiments herein provides a classification model, which controls fusion weights based on object detection and masking parameters.

Further, the method described in the embodiments herein provides techniques for using inertial sensors and GPS in tandem to convert device coordinates to celestial coordinates for accurate positioning of celestial objects, for re-drawing. Moreover, using inertial sensors and GPS also enables skip/reset fusion per frame based on global motion detection.

Furthermore, the method described in the embodiments herein enables the provision of additional controls to the user to choose custom fusion parameters like trail color, etc.

While specific language has been used to describe the present subject matter, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for generating an astro-lapse video on a user device, the method comprising:
    obtaining at least one current frame by capturing one or more stars via a camera of the user device, wherein the at least one current frame comprises the one or more stars;
    determining one or more regions within the at least one current frame, based on a degree of exposure and focus corresponding to the one or more regions;
    obtaining a set of subsequent frames comprising the one or more stars by capturing the one or more stars via the camera, wherein the exposure and focus of corresponding to one or more regions within the set of subsequent frames is corrected during the capturing based on the degree of exposure and focus corresponding to the one or more regions within the at least one current frame;
    determining fusion weights of the at least one current frame and the set of subsequent frames based on one or more cloud categories and a cloud density score associated with each of the one or more cloud categories; and generating an astro-lapse video by fusing the at least one current frame and the set of subsequent frames based on the determined fusion weights.

2. The method of claim 1, wherein the degree of exposure and focus is determined based on frame segmentation and a true north proximity factor associated with the one or more stars in the at least one current frame.

3. The method of claim 2, further comprising:
performing the frame segmentation for at least one of the at least one current frame or the set of subsequent frames by segmenting the corresponding frame into one or more areas and classifying each area into one or more objects.

4. The method of claim 3, wherein determining the one or more regions comprises:
identifying a preferred type of area and one or more non-preferred types of areas from the one or more segmented areas;
dividing the preferred type of area into a plurality of blocks;
comparing a brightness of each block with an average brightness of the plurality of blocks to obtain the degree of exposure and focus; and
determining, based on the comparison, the one or more regions corresponding to one or more blocks with the degree of exposure and focus being one of greater or less than a predefined threshold.

5. The method of claim 4, comprising:
classifying each block of the corresponding frame into one or more cloud categories;
determining, for each cloud category, the cloud density score; and
determining the fusion weights for the corresponding frames, based on the cloud classification and the cloud density score.

6. The method of claim 1, wherein generating the astro-lapse video comprises:
correcting a star shape associated with the one or more stars;
estimating a star trajectory associated with the one or more stars; and
generating the astro-lapse video by fusing the at least one current frame and the set of subsequent frames based on the determined fusion weights, the corrected star shape, and the estimated star trajectory.

7. The method of claim 6, wherein correcting the star shape comprises:
correcting a shape of at least one star of the one or more stars in the at least one current frame and the set of subsequent frames to obtain a plurality of star shape corrected frames;
assigning trail length weight to each star in a corresponding frame based on an angular separation;
estimating, for each star in the corresponding frames, a star trajectory based on the celestial positioning information of the one or more stars; and
obtaining a pixel location of each star in the corresponding frames based on the determined celestial positioning information of the respective star and a transformation map associated with celestial positioning information of the one or more stars.

8. The method of claim 7, comprising:
correcting a star trail of at least one star of the one or more stars, based on a corresponding star trajectory of the one or more star trajectories, to obtain a plurality of star trail corrected frames.

9. The method of claim 6, comprising:
receiving an input to generate colored astro-lapse videos; and
generating a colored astro-lapse by fusing the at least one current frame and the set of subsequent frames based on the determined fusion weights, the corrected star shape, and the estimated star trajectory along with a predetermined color map, wherein the predetermined color map is applied to the corresponding pixel location of the one or more stars in the plurality of frames.

10. The method of claim 7, wherein the fusing comprises:
fusing the at least one current frame and the set of subsequent frames, using a custom alpha blending technique, based on the plurality of star shape corrected frames, corresponding trail length weight, the plurality of star trail corrected frames, and the determined fusion weights.

11. The method of claim 1, comprising:
providing, to a camera hardware abstraction layer (HAL) of the user device, information associated with the one or more regions having the exposure and focus being one of greater or less than the threshold degree of exposure and focus; and
correcting the degree of exposure and focus of the determined one or more regions in a set of subsequent frames captured by the camera.

12. A system for generating an astro-lapse video on a user device, the system comprises:
memory storing instructions;
at least one processor;
wherein the instructions, when executed by the at least one processor, causes the system to:
obtain at least one current frame by capturing one or more stars via a camera of the user device, wherein the at least one current frame comprises the one or more stars;
determine one or more regions within the at least one current frame, based on a degree of exposure and focus;
obtain a set of subsequent frames comprising the one or more stars by capturing the one or more stars via the camera, wherein the exposure and focus of corresponding one or more regions within the set of subsequent frames is corrected during the capturing based on the degree of exposure and focus corresponding to the one or more regions within the at least one current frame;
determine fusion weights of the at least one current frame and the set of subsequent frames based on one or more cloud categories and a cloud density score associated with each of the one or more cloud categories; and
generate an astro-lapse video by fusing the at least one current frame and the set of subsequent frames based on the determined fusion weights.

13. The system of claim 12, wherein the degree of exposure and focus is determined based on frame segmentation and a true north proximity factor associated with the one or more stars in the at least one current frame.

14. The system of claim 13, wherein the instructions, when executed by the at least one processor, causes the system to:
perform the frame segmentation for at least one of the at least one current frame or the set of subsequent frames by segmenting the corresponding frame into one or more areas and classifying each area into one or more objects.

15. The system of claim 14, wherein to determine the one or more regions, the instructions, when executed by the at least one processor, causes the system to:
- identify a preferred type of area and one or more non-preferred types of areas from the one or more segmented areas;
- divide the preferred type of area into a plurality of blocks;
- compare a brightness of each block with an average brightness of the plurality of blocks to obtain the degree of exposure and focus; and
- determine, based on the comparison, the one or more regions corresponding to one or more blocks with the degree of exposure and focus being one of greater or less than a predefined threshold.

16. The system of claim 15, wherein the instructions, when executed by the at least one processor, causes the system to:
- classify each block of the corresponding frame into one or more cloud categories;
- determine, for each cloud category, the cloud density score; and
- determine the fusion weights for the corresponding frames, based on the cloud classification and the cloud density score.

17. The system of claim 12, wherein to generate the astro-lapse video, the instructions, when executed by the at least one processor, causes the system to:
- correct a star shape associated with the one or more stars;
- estimate a star trajectory associated with the one or more stars; and
- generate the astro-lapse video by fusing the at least one current frame and the set of subsequent frames based on the determined fusion weights, the corrected star shape, and the estimated star trajectory.

18. The system of claim 17, wherein to correct the star shape, the instructions, when executed by the at least one processor, causes the system to:
- correct a shape of at least one star of the one or more stars in the at least one current frame and the set of subsequent frames to obtain a plurality of star shape corrected frames;
- assign trail length weight to each star in a corresponding frame based on an angular separation;
- estimate, for each star in the corresponding frames, a star trajectory based on the celestial positioning information of the one or more stars; and
- obtain a pixel location of each star in the corresponding frames based on the determined celestial positioning information of the respective star and a transformation map associated with celestial positioning information of the one or more stars.

19. The system of claim 18, wherein the instructions, when executed by the at least one processor, causes the system to:
- correct a star trail of at least one star of the one or more stars, based on a corresponding star trajectory of the one or more star trajectories, to obtain a plurality of star trail corrected frames.

20. The system of claim 17, wherein the instructions, when executed by the at least one processor, causes the system to:
- receive an input to generate colored astro-lapse videos; and
- generate a colored astro-lapse by fusing the at least one current frame and the set of subsequent frames based on the determined fusion weights, the star shape correction associated with the one or more stars, and a star trajectory estimation associated with the one or more stars along with a predetermined color map, wherein the predetermined color map is applied to the corresponding pixel location of the one or more stars in the plurality of frame.

* * * * *